UNITED STATES PATENT OFFICE.

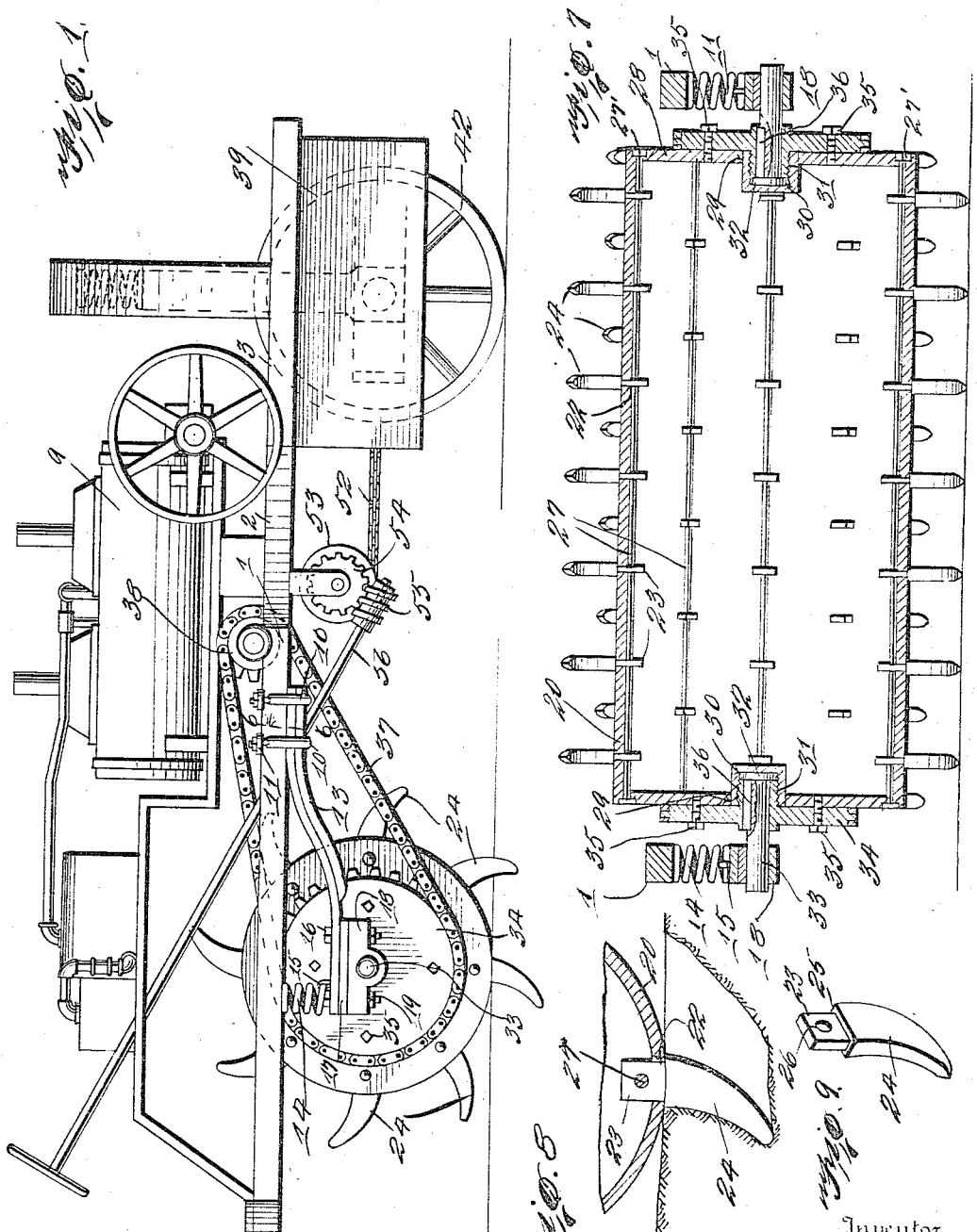

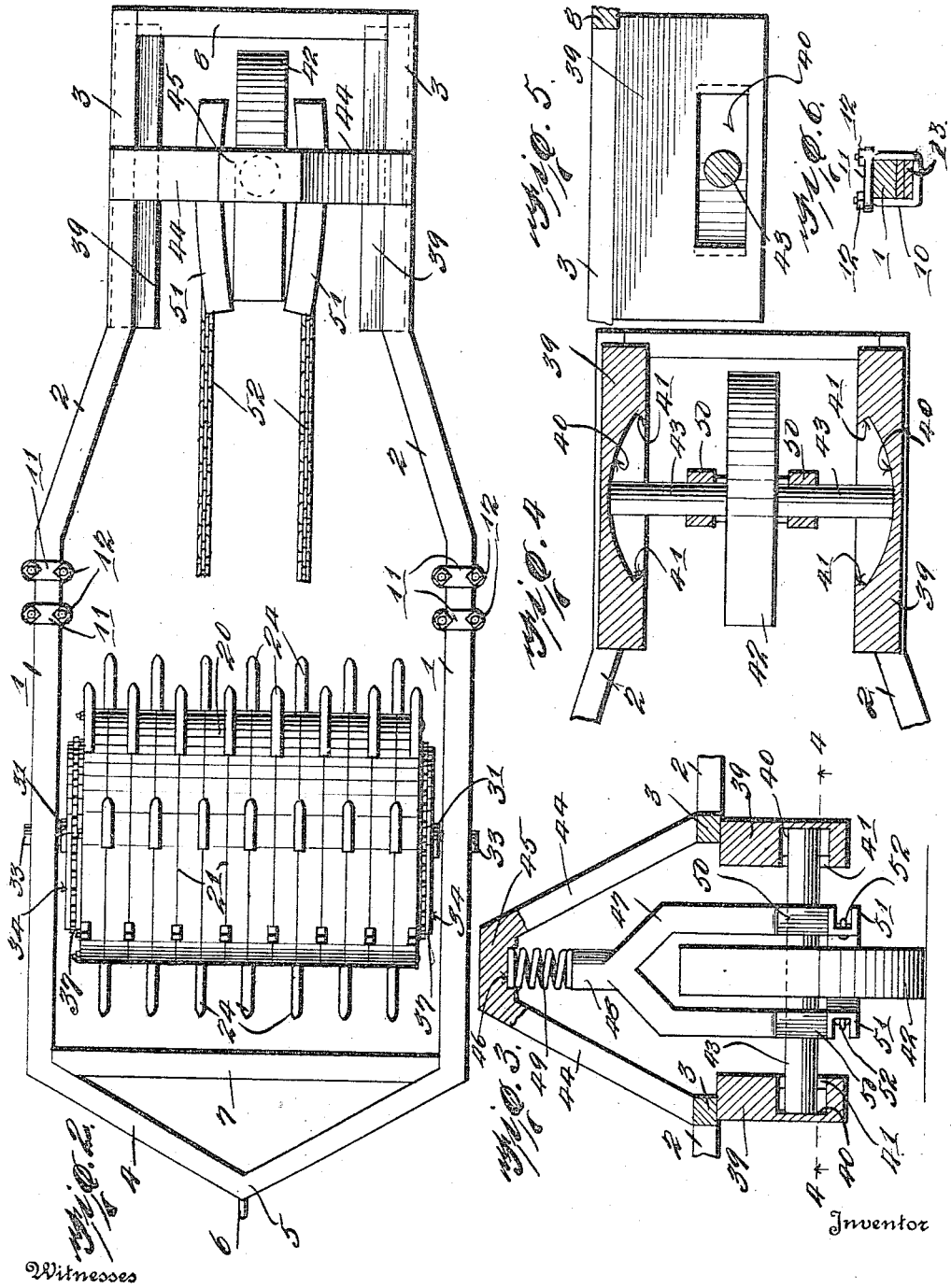

FRANCIS RUSSELL HEMENGER, OF ALGONAC, MICHIGAN.

TRACTION-ENGINE.

1,267,768.   Specification of Letters Patent.   Patented May 28, 1918.

Application filed February 23, 1916. Serial No. 80,035.

*To all whom it may concern:*

Be it known that I, FRANCIS R. HEMENGER, a citizen of the United States of America, residing at Algonac, in the county of St. Clair and State of Michigan, have invented certain new and useful Improvements in Tractor-Engines, of which the following is a specification, reference being had therein to the accompanying drawing.
This invention relates to a tractor engine and has for its principal object the production of a light tractor which is so constructed as to have the capacity and power of the ordinary heavy tractors now in use, whereby because of the reduced size and light construction of this engine it may be employed in smaller spaces or over supporting surfaces where such action could not take place if a larger and heavier engine were employed.

Another object of this invention is the production of a tractor engine having a frame upon which the motor is mounted, this frame being yieldably supported upon the front steering wheel and the supporting roller.

Another object of this invention is the production of a tractor engine which is light in construction and which is adapted to not only perform the functions of an ordinary tractor, that is, constituting a means for hauling loads or dragging plows, but which has its roller so constructed as to pulverize the ground over which the same passes, thus eliminating the necessity of pulverizing or harrowing the ground after the same has been upturned by a gang plow which this engine is adapted to draw.

Another object of this invention is the production of a tractor engine wherein the roller is hollow so as to reduce the weight of this engine in its assembled form, this roller being adapted to carry a number of heavy spurs which are fixedly mounted thereon, so that the spurs which are curved in the direction of the forward movement of the engine will dig into the ground for positively holding the roller in engagement therewith and preventing the same from slipping when in use, besides constituting a pulverizer for the ground.

Another object of this invention is the production of a tractor engine which has a wheel at the forward portions of its frame which wheel is adapted to yieldably support the forward portion of the frame by means of a spring and which has its axle carried within the forward sockets so as to permit the frame to move upwardly and downwardly when the spring yields, while the axle may be moved in a horizontal plane as a wheel is swung in either direction for steering the engine.

With these and other objects in view this invention consists of certain novel combinations, constructions, and arrangements of parts as will be hereinafter fully described and claimed.

In the accompanying drawings:

Figure 1 is a side elevation of the tractor engine as constructed in accordance with this invention.

Fig. 2 is a top plan view of the frame, roller, and steering wheel, the motor being removed.

Fig. 3 is a vertical sectional view of the forward portions of the frame, illustrating the manner in which the steering wheel is applied thereto.

Fig. 4 is a section taken on the line 4—4 of Fig. 3, looking in the direction of the arrows.

Fig. 5 is a plan view of the interior of one of the guides carried upon the forward portions of the frame, illustrating the socket formed therein and showing the axle in cross-section.

Fig. 6 is a section taken on the line 6—6 of Fig. 1, looking in the direction of the arrow.

Fig. 7 is a transverse vertical section through the roller which supports the rear portions of the frame.

Fig. 8 is a fragmentary sectional view of a portion of the roller, showing one of the spurs in elevation.

Fig. 9 is a detail perspective view of one of the spurs.

Referring to the accompanying drawings by numerals it will be seen that 1 indicates the side portions of the frame, which sides 1 converge as indicated at 2, toward their forward ends, which then extend in parallel relation as shown at 3. The rear ends of the sides 1 converge radically as shown at 4, to form the integral points 5 which carry the staple 6. The brace 7 is carried adjacent the rear portions of the sides 1 so as to reinforce the rear portions of the frame. The straight forward ends 3 are also connected by means of the straight bar 8, whereby the frame will comprise a very rigid and substantial structure upon which the motor 9 is supported.

This motor 9 as herein disclosed is of gas or gasolene power, although it is, of course, obvious that any form or construction of a motor may be mounted upon the frame without departing from the spirit of the invention.

The U-shaped bolts 10 which embrace the sides 1 of the frame are held in position by means of the plate 11 and nuts 12. The leaf spring 13 is wound upon each of the sides as clearly shown in Figs. 1 and 2, and has its lower end spaced normally at a distance from the under surface of the frame so as to permit the leaf spring 13 to carry a reinforcing coil spring 14 thereon, which coil spring is anchored in position by means of the clips 15 secured to the leaf spring. The bolts 16 pass through the leaf spring 13 and also through the filler block 17 mounted upon the bearing block 18, while the retaining nuts 19 are carried upon the lower portions of the bolts 16, thus permanently retaining the filler block 17 upon leaf spring. Thus, it will be seen that the journal blocks will be yieldably retained in their correct positions.

The ground roller or pulverizer comprises a hollow cylindrical tube 20 which is adapted to fit between the sides 1 of the frame, being of nearly the same width as the frame. This hollow cylindrical roller 20 is adapted to have a number of parallel lines 21 formed thereon so as to indicate the correct positions for forming the openings 22 for the reception of the necks 23 of the spurs 24. These necks 23 are considerably smaller than the spurs 24 and as a consequence, form the shoulders 25. The openings formed along one of the lines 21 are formed in staggered relation with respect to the openings formed in adjacent lines so that when the spurs are carried upon the roller they will be carried in staggered relation although there will be formed a number of complete lines of spurs entirely across the periphery of the roller. The spurs are positioned upon the outer portions of the roller so as to allow the shoulder 25 thereof to fit upon the periphery of the roller thus causing the inner movement of the spurs to be limited. The necks 23 are provided with apertures 26 formed therein and since the rows across the roller from end to end extend in direct alinement with each other, the rod 27 may be passed through the end of the roller and through the central portions thereof so as to pass through the apertures 26 of the necks 23 thus positively holding the spurs 24 upon the periphery of the roller, after which the nut 27' may be positioned upon the rod 27 for holding the rod against accidental displacement. These spurs 24 are curved throughout their entire length in the direction the tractor engine moves when moving forwardly, whereby the ends of the spurs will first dig into the ground until the spurs are entirely embedded in the ground and because of their curved construction will hold the roller positively upon the ground. If the spurs were straight the roller might not penetrate the ground because of the fact that the weight of the engine would not be sufficient to cause the spurs to dig into the ground to their entire length. As they are curved, however, in the direction of the forward movement of the engine the propelling power of the engine will cause the curved spurs to dig into the ground for their entire length, thus holding the roller at all times evenly upon the ground. The ends 28 of the roller 20 have the openings 29 formed therein for the reception of the cap 30. This cap 30 fits upon the hub 31 so as to hold the head 32 upon the hub and within the cap, whereby the stub axle 33 will be positively held in its correct position upon the end of the roller 20. Each hub 31 has a sprocket 34 formed integral thereon and these sprockets 34 are screwed or bolted as shown at 35 upon the end 28 of the roller 20. It is, of course, obvious that a key 36 may be carried upon each stub axle 33 for keying the sprocket 34, although, of course, it is not necessary for rotary movement will be imparted to the roller 20 by means of the sprockets 34. These stub axles 33 are carried by the journal blocks 18, thus supporting the rear portions of the frame of the tractor engine. The chain 37 is carried upon each sprocket 34 and also passes around the drive sprockets 38 carried by the motor 9 so that when the sprockets 38 are in operation each chain will be driven so as to impart rotary movement to the motor for driving the tractor engine.

The guides 39 comprise flat depending plates which are secured upon the lower portions of the parallel front ends 3 of the frame. Each guide 39 is provided with a curved pocket 40 formed upon its inner face, which pocket has the abutment shoulders 41 at its ends, as shown most clearly in Fig. 4. The steering wheel 42 is positioned between the guides 39 and has its axle 43 extending into the sockets. It will be noted, however, that the breadth of the sockets is greater than the diameter of the axle 43 for purposes to be hereinafter set forth. The yoke 44 is formed upon the forward ends 3 of the frame, extending for a considerable distance thereabove and converging at its upper end to provide the top 45 in which there is formed a receiving socket 46. The fork 47 fits over the steering wheel 42 and has its stem 48 yieldably retained in spaced relation, with respect to the top 45 of the yoke 44, by the coil spring 49. This coil spring is permanently fastened to the stem 48, its lower end bearing upon the upper end of the stem 48, its opposite end resting loosely within the pocket 46 formed in the top 45. From this construction it is obvious that the fork will very readily pivot in the socket, the shank will also reciprocate in a vertical plane with the opening when abnormal pressure is applied to the coil spring. The lower portions of the fork 47 are thickened as shown at 50 so as to carry the axle 43. Since the steering wheel 42 is carried upon the axle 43 the frame will be yieldably supported at its forward end inasmuch as the fork will support the coil spring 49, which will permit the forward end of the frame to yield or move when passing over uneven surfaces, thus taking up considerable of the strain which would otherwise be imparted to the frame if the spring were not employed. Since the movement of the frame when passing over uneven surfaces would cause the guides 39 to move vertically there is provided sufficient play for the shaft 43 because of the width of the sockets formed in the guides 39. Secured in any suitable manner upon the lower end of the thickened portion 50 of the fork 47 are the chain guides 51 in which the forward end of the guide chains 52 are anchored. The rear ends of the chains extend so as to be carried upon any suitable drum 53 which is rotated by means of the gear 54 and the worm 55 carried upon the lower end of the steering rod 56. Thus, it will be seen that as the steering rod 56 is turned it will cause the drum 53 to be rotated so as to draw upon one chain, while unwinding the other, thus causing the chains to draw upon the chain guides 51, thus causing the wheel to be swung to one side or the other. This is possible because of the fact that as the wheel is swung to one side sufficient space is provided for the ends of the axle 43 to move within the sockets formed in the guides 39 until the ends of the axle 43 come into engagement with the abutment shoulders 41, thus limiting the swinging movement of the axle in a horizontal plane. Thus, it will be seen that it will be impossible to swing the wheel so far to one side or the other as to cause the same to engage either the guides 39 or to permit the axle to move from the sockets, thus disengaging the guides.

Since the axle 43 is of a one-piece construction it will be seen that as one chain is being wound upon the drum 53 it will be pulling one end of the axle rearwardly and this action will, of course, cause the opposite end of the axle to be swung forwardly. This movement of the axle is permitted since when one chain is being wound upon the drum the remaining chain is being unwound, and, accordingly, permits the end of the axle to which it is attached to be swung forwardly. Thus, the wheel 42 may be turned to either side desired to steer the engine. It is obvious that by reversing the drum 53 the movement of the chains will be reversed, so that the chain which has just been wound upon the drum will be unwound, while the chain which has just been unwound will be wound upon the drum. This reversed movement of the chains will reverse the movement of the axle, causing the end of the axle which has just been moved rearwardly to be moved forwardly, while the end of the axle extending rearwardly will be moved forwardly, thus returning the axle to its normal position for causing the wheel 42 to be swung to direct the engine straight ahead.

When this tractor engine is in operation it will first assume the position shown in Fig. 1. As the motor 9 is started it is, of course, obvious that the chains will cause the roller to rotate, thus causing the spurs 24 to dig into the ground as the roller rotates. Since these spurs are carried upon the roller in staggered relation it will be seen that the sod and grass will be cut in rows, although the tearing action of the spurs along one of the lines 21 will be from the space in the spurs upon the adjacent lines upon each side thereof, thus causing the earth to be thoroughly turned and pulverized. As the plows which may be drawn by this engine turn over the ground it will be seen that the ground will be so thoroughly pulverized as to make the harrowing or further pulverizing thereof unnecessary. As the tractor moves along the steering post or rod it will be rotated so as to cause motion to be imparted to the drum 53 for the actuation of the chains 52. This movement of the chains 52 will cause the steering post 42 to be swung to one side or the other, as the axle 43 moves between the sockets formed in the guides 39. As the tractor engine moves over uneven surfaces or plowed ground it will be seen that the leaf spring 13 and coiled springs 14 and 49 will yield so as to permit the frame to move slightly, whereby the vibration and jar of such action will be taken up by the movement of the springs. It is, of course, obvious that if so desired, the retaining plates may be removed from engagement with the roller 20, whereby the spurs 24 may be used and lugs, or the like, may be applied to the roller if so desired. Under such conditions it is obvious that the tractor engine may be employed for drawing loads along the roads and over bridges, while the light construction of the engine will permit the same to pass over bridges, and other structures without danger of the same breaking through, as would be the case if the heavier engines now in use were employed.

It will be seen from the foregoing description that a very simple and efficient tractor engine has been produced which is so light in construction as to permit the same to be very easily moved from place to place, while the roller is constructed so as to not only constitute a drive for the engine, but also a pulverizer therefor, while the mounting of the steering wheel is such as to not only steer the engine but to also permit the end of the frame to move upon the supporting spring when the engine is passing over uneven surfaces.

What is claimed is:

1. In a tractor engine of the class described, the combination of a frame, said frame being adapted to carry a motor, means for supporting the rear portions of said frame and being adapted to be connected to the motor for driving the engine, guides fixedly mounted upon the forward portions of said frame, said guides being provided with elongated curved sockets having abutment shoulders at their ends, an axle having its end portions positioned within said sockets, said sockets being of greater width than the diameter of said axle, a guiding wheel carried upon said axle, means for moving said axle in a horizontal plane, whereby the tractor engine may be moved in a desired direction, means for yieldably supporting the forward portions of said frame upon said axle, whereby when passing over uneven surfaces the frame may be moved so as to reduce the vibration or jar thereon.

2. In a tractor engine of the class described, the combination of a frame, said frame being adapted to carry a motor, means for supporting and driving said frame, a yoke fixedly carried upon the forward end of said frame and having a top at its upper portion, said top having a pocket formed therein, guides carried upon the lower forward portions of said frame, said guides having curved sockets terminating in abutment shoulders at their ends, an axle having its end portions fitting within said sockets, a steering wheel carried upon said axle, a fork mounted upon said axle and being provided with a stem at its upper end, a coil spring bearing upon the upper end of said fork and fitting within the pocket of said top, whereby the forward end of said frame will be yieldably supported, said sockets being of a greater width than the diameter of said axle, whereby when passing over uneven ground said coil spring may yield for taking up the jar and vibrations, and means for swinging said axle for turning said wheel in a desired direction when it is desired to steer said engine.

In testimony whereof I hereunto affix my signature.

FRANCIS RUSSELL HEMENGER.

Copies of this patent may be obtained for five cents each, by addressing the "Commissioner of Patents, Washington, D. C."